July 30, 1929. G. H. SCHIEFERSTEIN 1,722,767
PNEUMATIC OSCILLATING SYSTEM AND LOOSELY OPERATIVE PNEUMATIC COUPLINGS
Filed Jan. 28, 1925
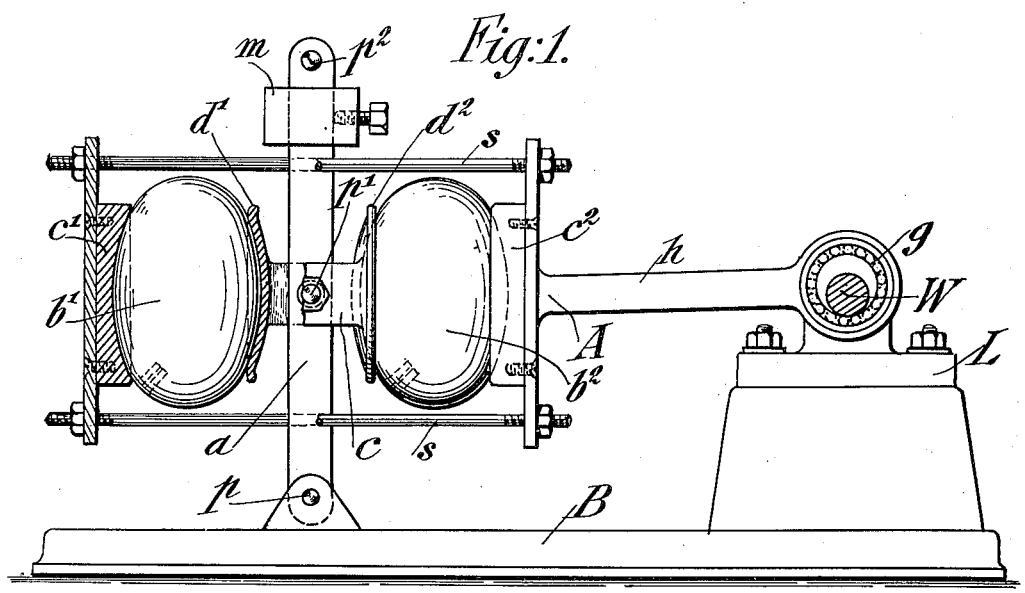
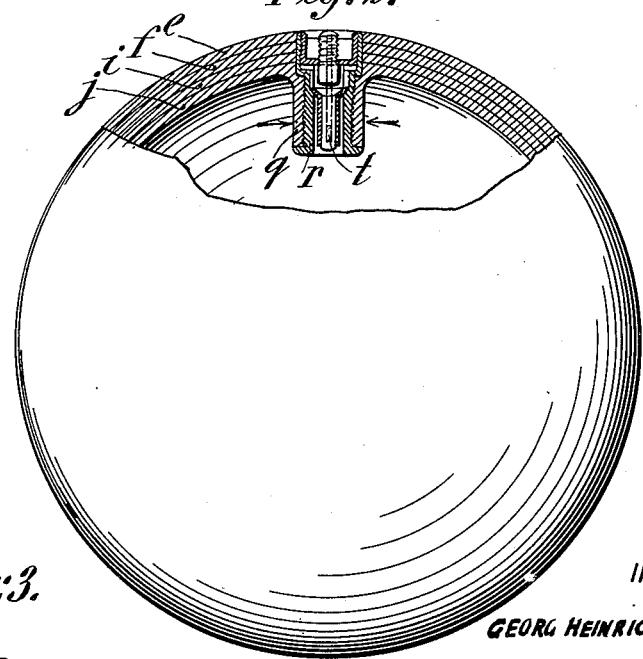
INVENTOR
GEORG HEINRICH SCHIEFERSTEIN
ATTORNEYS.

Patented July 30, 1929.

1,722,767

UNITED STATES PATENT OFFICE.

GEORG HEINRICH SCHIEFERSTEIN, OF BERLIN-CHARLOTTENBURG, GERMANY.

PNEUMATIC OSCILLATING SYSTEM AND LOOSELY-OPERATIVE PNEUMATIC COUPLINGS.

Application filed January 28, 1925, Serial No. 5,408, and in Germany February 5, 1924.

My invention relates to an arrangement for the transmission of power in form of mechanical oscillation by means of systems which are loosely coupled and which are oscillating in their natural frequency and which are connected by pneumatic, elastic means. According to my previous applications a system capable of mechanical oscillations and a generator for mechanical oscillations are required to create and operate a mechanically oscillating system. For this purpose, a unit is used which is capable of mechanical oscillations; it consists of accumulating elastic means and oscillating masses connected therewith; these means and masses are synchronized with the generator of mechanical oscillations.

I have described in other applications the various types of loose mechanical couplings; they are: elastic couplings, mass couplings, friction couplings and time couplings, which may also be classified as kinetic and potential couplings. In those applications I also indicated that it is feasible to combine two or more of the different couplings; therefore an almost unlimited number of methods of coupling are possible. It is, however, understood that some of the possibilities of combination cannot be applied for certain practical purposes whereas other couplings and combinations show great advantages in reference to the various fields of applied dynamics.

My invention consists of such a constructive arrangement which has yielded particularly favorable results after exhaustive experiments and investigations. The substance of my invention is to use pneumatic air cushions in the place of springs as accumulating or coupling elastic means. For this purpose I enclose a quantity of air in a container which may have various forms and which partly or wholly consists of rubber. The advantage of rubber enclosed air cushions, as compared with air cushions enclosed in cylinders with reciprocating pistons, is an essential decrease of the interior losses due to friction and leakage.

In the drawings Fig. 1 illustrates one form of assembly of my invention showing in a side view the shaft of the generator of oscillations and the coupled oscillating system.

Fig. 2 is a separate view of the elastic pneumatic means.

Fig. 3 shows a valve as customarily used in pneumatics and serves to illustrate the disadvantage of this valve as compared with my arrangement.

In Fig. 1. two rubber balls $b_1$ and $b_2$ are compressed by the four tension rods $s$ between two sets of jaws, $c_1$, $d_1$ and $c_2$, $d_2$, respectively.

The jaws $d_1$, $d_2$, are connected by the links $c$ and these links are rotatively mounted on pivot $p_1$ on the lever $a$ which passes between the two links. This lever $a$ is fulcrumed to the base-plate $b$ in pivot $p$. The upper end of the lever $a$, carries the adjustable mass $m$ and a pivot $p_2$, where energy in form of mechanical oscillations may be applied or taken from.

The massive outer jaws are part of a frame held together by the four tension rods $s$, and are operatively connected by the connecting rod $h$ and eccentric $g$, which may have a ball-bearing as shown, to the shaft $w$, rotating in bearings $l$ which in turn are mounted on the base-plate $b$.

The balls $b_1$, and $b_2$ which are normally perfectly spherical are shown in Fig. 1 partly compressed by the tension rods $s$.

The sectional view of one of the rubber balls in Fig. 2 shows on the inside of the ball a soft rubber plug $q$. In this soft rubber plug a valve-tube is fastened, on the inside of which the valve proper $t$ is mounted. The valve $t$ is constructed like an ordinary valve used for pneumatic tires. A tight connection between the valve tube $r$ and the rubber plug $q$ is automatically produced by the pressure of the air on the inside of the rubber ball since that pressure as indicated by arrows presses the soft rubber plug against the tube $r$.

It is not practical to mount the valve which serves for regulating the pressure of the air, in the same manner in which it is mounted on pneumatic tires as illustrated in Fig. 3. Such valves mounted on the outside would be disadvantageous not only for reasons of construction but also because the valve on the outside would permit a bulging deformation in the neighborhood of the valve on account of more pressure on the inside, as illustrated in Fig. 3. Ultimately this pressure would force the seat of the valve to protrude from the ball.

With my design of an inverted valve the ball is perfectly spherical on the outside and yet by pumping in new air it may be inflated and deflated ad libitum.

To decrease the escape of air through the rubber wall when the ball is under the high pressure on the inside, the wall of the ball is made out of the plurality of layers which are arranged on top of each other. I use here the principle of "stepping down" pressures (as commonly used in the electrical field); i. e., taking for instance the pressure on the inside of a ball of any desired dimensions as 195 lbs.; this pressure is insulated against the outside by rubber layers, in this instance four, which may be of different or the same thickness; assuming that the pressure decreases in equal steps from layer to layer, when the layers have the same thickness and characteristics, and taking the atmospheric pressure at roughly 15 lbs. the total difference of pressure between the outside and the inside would be 180 lbs.; the difference between the pressure on the outside and the third layer from the outside would be only 135 lbs.; it would be 90 lbs. between the outside and the second layer and only 45 lbs. between the outside and the first layer, therefore each layer in itself has to take care of a pressure of 45 lbs. only.

What has been stated about "stepping down" the pressure of the air may also be applied to the heat between the outside and the inside; i. e., the heat losses owing to continuous compression and expansion, which are very small if a heat insulator like rubber is used, are further decreased by subdividing the enclosure into separate layers $e$, $f$, $i$ and $j$ so that the difference of heat between adjoining layers becomes relatively small.

A plurality of layers has the additional advantage that the hollow ball even after having been compressed for a comparatively longer interval of time in a very defined direction will immediately assume its completely spherical shape after the pressure has been taken away. The cause of this is that the single layers are many times more able to respond to a change of the inner pressure than a rubber enclosure of heavy cross-section.

Furthermore, to decrease the leakage of air through the pores of the rubber, each layer can be submitted to a treatment which closes the pores of the layers.

The crank shaft operating the eccentric $g$ has a relatively small eccentricity. Assuming now that the shaft $w$ is slowly put into counter-clockwise rotation, the connecting rod $h$ will first move to the left, and assuming that the lever $a$ with the mass $m$ will not immediately participate in this motion owing to its inertia, the ball $b_2$ will be compressed more whereas the pressure is taken away from the ball $b_1$. After the inertia of $a$ and $m$ has been overcome, they will always move in the same direction, to the left, and will reach their extreme position to the left, when the frame has reached approximately the extreme position to the right by a further 180 degree rotation of the shaft $w$. In this moment, therefore, the pressure of ball $b_1$ has been increased and the pressure on ball $b_2$ has been relieved, a phenomenon, which changes with every turn of the shaft $w$ in respect to pressure and direction of movement; in case of resonance the greatest amplitude of lever $a$ with mass $m$ is obtained. If I choose now a crank eccentricity of $\frac{L}{2}$, giving the eccentric an amplitude $L$ and determining that the lever $a$ with its mass $m$ in case of resonance gives an amplitude $x$, I can, if it is only the question of maintaining this oscillation, obtain almost complete balancing of forces and masses by providing that the active force $$\frac{m.V^2}{2}$$

of the parts mounted between the balls $b_1$ and $b_2$ equals the active force $$\frac{M.v^2}{2}$$

of the unit on the shaft $w$. In this case the most favorable balancing of masses and forces is obtained and, provided the tuning has been perfect, the greatest efficiency of my arrangement has been reached. The balancing of masses is theoretically perfect, when there is a zero phase-displacement, a condition which of course can never be completely reached with machines performing actual work. However, I obtain, even in the case on hand, without further auxiliary means and in spite of the simplicity of the arrangement a relatively efficient balancing of masses and therefore, an excellent means for power transmission for practical purposes.

My arrangement as described above has an additional advantage. The elastic means I use, the air, is almost without mass and therefore it does not cause any increase in weight nor the other disadvantages which might be caused by the mass of the elastic means.

The experiments with this arrangement have furthermore demonstrated that the interior losses in the elastic pneumatic means are extremely low even in the transmission and performance of relatively heavy duty.

It may be assumed that the heat produced in the balls by a high compression is returned and used up in expansion to a much higher degree—owing to the excellent heat insulation of the rubber—than in the case of metallic cylinders. I therefore, draw the conclusion that the overall losses are minimized in particular by my use of heating insulating materials.

It is sometimes desirable for the performance of a specific duty that the amplitude of mass be increased or decreased, or more or less power than available from the mass between the rubber balls, is required. In that case transformation of a product of force and distance to the most favorable proportion of the respective components may be obtained by an additional lever transmission.

It is frequently desirable to fix a maximum amplitude for the distance of travel of the mass between the rubber balls. This may be obtained by dimensioning the balls: the capacity for potential energy of the balls increases much faster than proportionally (adiabatically) and very soon obtains the value infinity for practical purposes.

Of course, in the construction described, steel springs or other elastic means might take the place of the rubber balls but in using rubber balls there is the particular advantage that by an increase of the tension exerted by the tension rods the natural frequency of the balls is changed in proportions relatively much larger since the curve of pressure runs (adiabatically).

I do not claim broadly herein the method of and means for loose mechanical coupling nor the other features not specifically pointed out in the claims, having filed separate applications for such features under Serial No. 688,876 filed January 26th, 1924.

Claims.

1. In a device of the character described, in combination, a driving unit, a driven unit, one of which is naturally oscillating, and an operatively loose coupling including elastic pneumatic means with an india-rubber casing.

2. In a device of the character described, in combination, a driving unit, a driven unit, one of which is naturally oscillating, and an operatively loose coupling including elastic pneumatic means, formed by cushions of compressed air, with india-rubber casings.

3. In a device of the character described, in combination, a driving unit, a driven unit, one of which is naturally oscillating, and an operatively loose coupling including elastic pneumatic means, formed by cushions of compressed air, with casings consisting of a plurality of layers of india-rubber.

4. In a device of the character described, in combination, a driving unit, a driven unit, one of which is naturally oscillating, and an operatively loose coupling including elastic pneumatic means, formed by cushions of compressed air, with casings consisting of a plurality of layers of india-rubber, each layer being treated with a tightening substance to close the pores.

5. In a device of the character described, in combination, a driving unit, a driven unit, one of which is naturally oscillating and an operatively loose coupling including elastic pneumatic means, formed by cushions of compressed air in india-rubber casings, each bearing a valve.

6. In a device of the character described, in combination, a driving unit, a driven unit, one of which is naturally oscillating, and an operatively loose coupling including elastic pneumatic means formed by cushions of compressed air in india-rubber casings each bearing an air pressure regulating valve.

7. In a device of the character described, in combination, a driving unit, a driven unit, one of which is naturally oscillating, an operatively loose coupling including elastic pneumatic means formed by cushions of compressed air in india-rubber casings, and a valve embedded in said rubber casing in such a way that the rubber is tightened against said valve by the pressure of the compressed air in the interior of said casing.

8. In a device of the character described, in combination, a driving unit, a driven unit, one of which is naturally oscillating, an operatively loose coupling including elastic pneumatic means formed by cushions of compressed air in a rubber casing, and a valve inside of a rubber-plug arranged on the inner-face and forming part of said rubber casing.

9. In a device of the character described, in combination, a driving unit, a driven unit, one of which is naturally oscillating, an operatively loose coupling including elastic pneumatic means formed by cushions of compressed air in a rubber casing, and a valve inside of a plug made of very soft rubber arranged on the inner-face and forming part of said rubber casing.

10. In a device of the kind described, two oscillating units, a frame operatively connected to the oscillating parts of one of said units, elastic pneumatic bodies held in said frame, and a head operatively connected to the oscillating parts of the other one of said units and interposed between said elastic pneumatic bodies.

11. In a device of the kind described, in combination, two oscillating units, a tension frame operatively connected to the oscillating parts of one of said units, elastic pneumatic bodies clamped in said frame under tension, and a head operatively connected to the oscillating parts of the other one of said units, held under tension between said elastic pneumatic bodies.

12. In a device of the kind described, two oscillating units, a frame operatively connected to the oscillating parts of one of said units, elastic pneumatic bodies held in said frame, and a head operatively connected to the oscillating parts of the other one of said units and interposed between said elastic pneumatic bodies, said frame and said head being good heat conductors.

13. In a device of the character described, in combination, two oscillating units one of which is naturally oscillating and an operatively loose coupling including elastic pneumatic means, the masses of said oscillating units being proportioned so as to substantially equalize their momentum.

14. In a device of the character described, a pitman formed of a plurality of parts, and coupling means between said parts, said coupling means comprising hollow elastic air filled bodies having normally closed valves arranged in inverted position within the same, the walls of said bodies being substantially formed of rubber.

15. In a device of the character described, a pitman formed of a plurality of parts, and coupling means between said parts, said coupling means comprising spaced hollow air filled bodies, the walls of which are formed of a plurality of layers of rubber superimposed upon each other.

In testimony whereof I affix my signature.

GEORG HEINRICH SCHIEFERSTEIN.